United States Patent [19]

Sanchez

[11] Patent Number: 4,513,911
[45] Date of Patent: Apr. 30, 1985

[54] AUXILIARY VEHICLE SPACE HEATER

[76] Inventor: Francis F. Sanchez, 62 Gibbard Crescent, Collingwood, Ontario, Canada, L9Y 2C2

[21] Appl. No.: 510,684

[22] Filed: Jul. 5, 1983

[51] Int. Cl.³ .............................................. B60H 1/02
[52] U.S. Cl. .......................... 237/12.3 C; 123/142.5 R
[58] Field of Search ...................... 237/12.3 A, 12.3 B, 237/12.3 C; 98/2.05, 2.06, 2.07; 123/142.5 R; 126/110 B, 350 A

[56] References Cited

U.S. PATENT DOCUMENTS

| | | | |
|---|---|---|---|
| 1,611,424 | 12/1926 | Ely | 237/12.3 A |
| 2,531,019 | 11/1950 | Audet | 237/12.3 B |
| 2,621,857 | 12/1952 | Wixon | 237/12.3 C |
| 3,072,176 | 1/1963 | Sunday | 237/12.3 C |
| 3,690,549 | 9/1972 | Hardy | 237/12.3 C |
| 4,280,330 | 7/1981 | Harris et al. | 237/12.3 C |
| 4,295,606 | 10/1981 | Swenson | 237/12.1 |

Primary Examiner—Henry Bennett
Attorney, Agent, or Firm—Sim & McBurney

[57] ABSTRACT

An auxiliary vehicle interior space heater comprises a housing to be mounted on the fire wall of the vehicle. Within the housing a plurality of tubes extend therethrough. The tube ends are in communication with the space exterior of the housing. A gas burner, which uses a portable form of fuel, is located in the housing for heating the tubes. A set of tube ends exterior of the housing is positioned to be in communication with the vehicle interior. The gas burner heats the tubes to heat the air within and by convection cause the heated air to enter the vehicle interior. This arrangement provides an economical unit for heating vehicle interiors and may be adapted to heat the coolant system of the vehicle motor.

9 Claims, 5 Drawing Figures

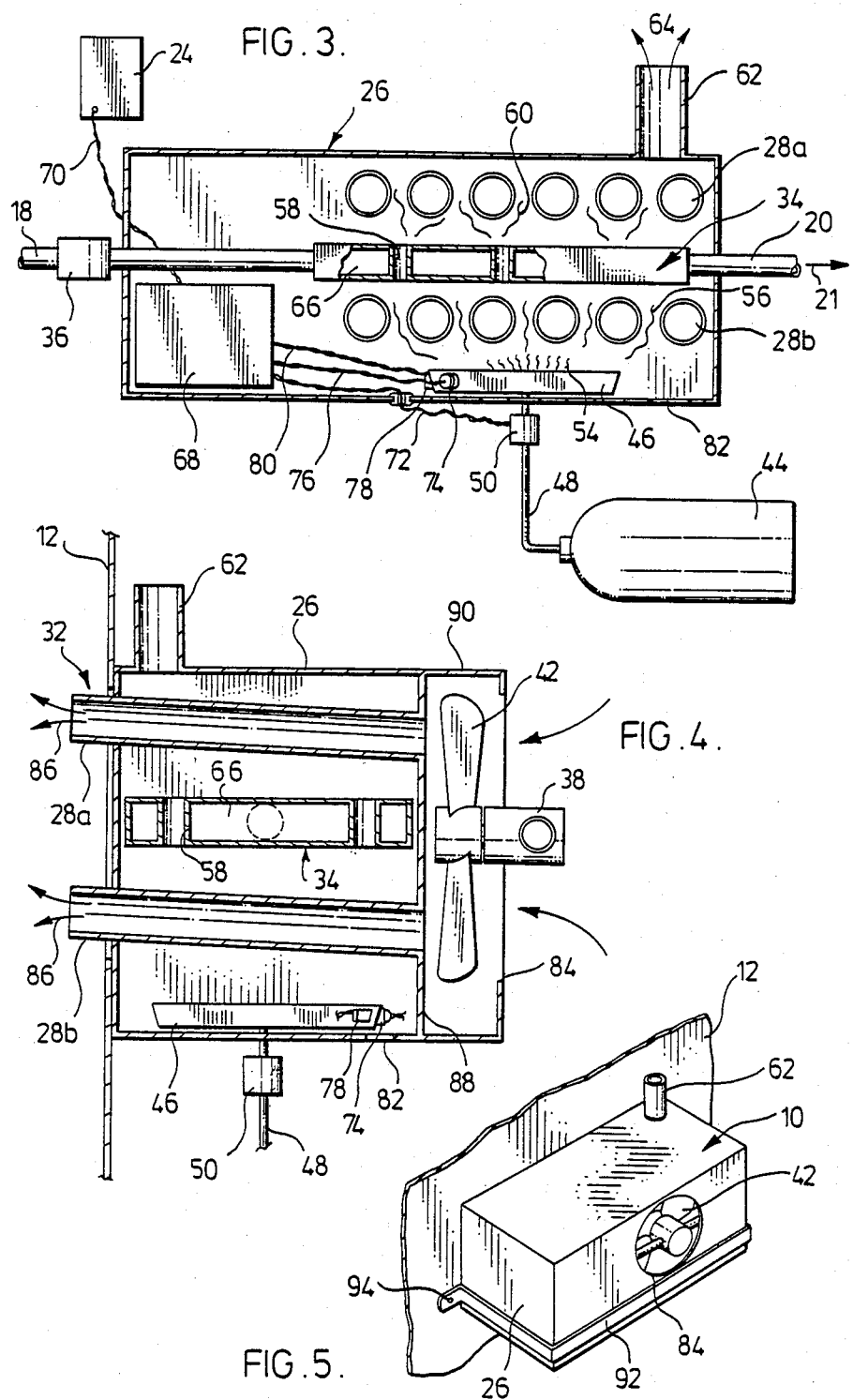

AUXILIARY VEHICLE SPACE HEATER

FIELD OF THE INVENTION

This invention relates to vehicle interior space heaters of the type which are mounted on the vehicle and use a portable form of fuel.

BACKGROUND OF THE INVENTION

Many types of vehicle heaters have been developed. Arrangements for such heaters are disclosed in U.S. Pat. Nos. 2,616,412, 3,072,176 and 4,105,158. The units are complex in nature and thus expensive to manufacture and costly for the vehicle owner. The units take up considerable space and because of several moving parts, they are maintenance intensive. A simpler construction for a vehicle interior space heater is disclosed in U.S. Pat. No. 3,690,549; however, the heat exchange with the interior air is not efficient and therefore requires a considerable size burner to effect sufficient heating to warm the car interior. In addition, there is no provision in this arrangement for heating the coolant of the car engine since the unit is adapted for use in the rear portion of the car.

The interior space heater of this invention overcomes the above problems in providing an economical, efficient interior space heater which may be readily adapted to also heat the engine coolant.

SUMMARY OF THE INVENTION

According to an aspect of the invention, an auxiliary vehicle interior space heater comprises a hollow metal housing with a plurality of metal tubes extending generally parallel to each other and through the housing. The tube ends are in communication with the space exterior of the housing. A gas burner is provided in the housing which uses a portable form of fuel for heating the tubes. Means mounts the housing on the interior wall of the vehicle with an opening to place the tube ends in communication with vehicle interior. The mounting means, when used on a vehicle interior wall, positions the tubes to slant them slightly upwardly towards vehicle interior. The gas burner heats the tubes to heat the air within and by convection causes the heated air to enter a vehicle interior. Means is provided for venting combustion products from the gas burner to exterior of the housing.

According to an another aspect of the invention, a metal chamber may be provided in the housing. The chamber would extend generally in the direction of the tubes with the tubes proximate the chamber. The chamber has an inlet and outlet extending exterior of the housing for connection to car engine coolant system. The gas burner heats the chamber to warm the coolant in the chamber and cause a flow of coolant through the chamber via the inlet and outlet.

According to a preferred aspect of the invention, a fan may be associated with the tube ends for assisting the flow of air through the tubes and into the vehicle interior. Means is provided for extracting energy from the flow of the coolant to drive the fan.

BRIEF DESCRIPTION OF THE DRAWINGS

Preferred embodiments of the invention are shown in the drawings wherein:

FIG. 3 is a vertical section through the heater of FIG. 2 in a direction perpendicular to the heating tubes of the unit;

FIG. 4 is a vertical section through the heater unit of FIG. 2 in a direction parallel to the tubes of the heater unit; and FIG. 5 is a perspective view of the heater unit as attached to the interior wall of a vehicle.

DETAILED DESCRIPTION OF THE PREFERRED EMBODIMENTS

Figure 1:
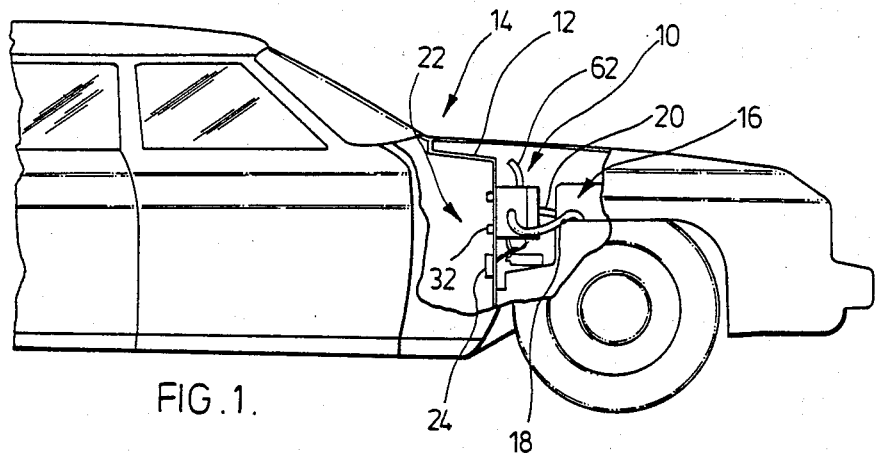
FIG. 1 is an elevation of a car showing the location of an interior space heater according to this invention.

The heater, according to this invention, is useful in many types of vehicles ranging from small cars to large trucks and tractors used in industry. The heater may be mounted on an interior wall of any portion of the car interior where space permits, such as the rear wall of the vehicle or on the fire wall of the vehicle. Referring to FIG. 1, the ideal location of the heater unit 10 is on the front fire wall 12 of the vehicle 14. This is preferable when the heater unit 10 is adapted to heat the coolant of the vehicle engine 16. Hoses 18 and 20 interconnect the heater 10 to the engine coolant system where hose 18 is the inlet to the heater and hose 20 is the outlet which delivers the heated coolant or antifreeze to the engine block to maintain it at an elevated temperature during cold weather.

It is obviously desirable to have a device to heat the interior of the vehicle particularly when the vehicle is not in use, such as the vehicle sitting outside overnight. The heater is adapted to use a portable form of fuel which is burned to provide the necessary heat which is then heat exchanged with and transmitted to the car interior 22. A thermostat 24 for sensing the vehicle interior temperature may be use in conjunction with an electronic or electrical controller. The controller is programmed so that upon sensing an interior temperature below a preset level, turns on the heater 10 and commences warming of the car interior. Simultaneously if the heater unit 10 is connected to the coolant of the motor 16, it will also commence heating of the engine coolant.

It is appreciated with coolant arrangements that valves are used to ensure that, when the engine is operating, the coolant does not circulate through the heater 10. Such valving arrangements are readily understood by those skilled in the art for use on the coolant system tubing.

Figure 2:
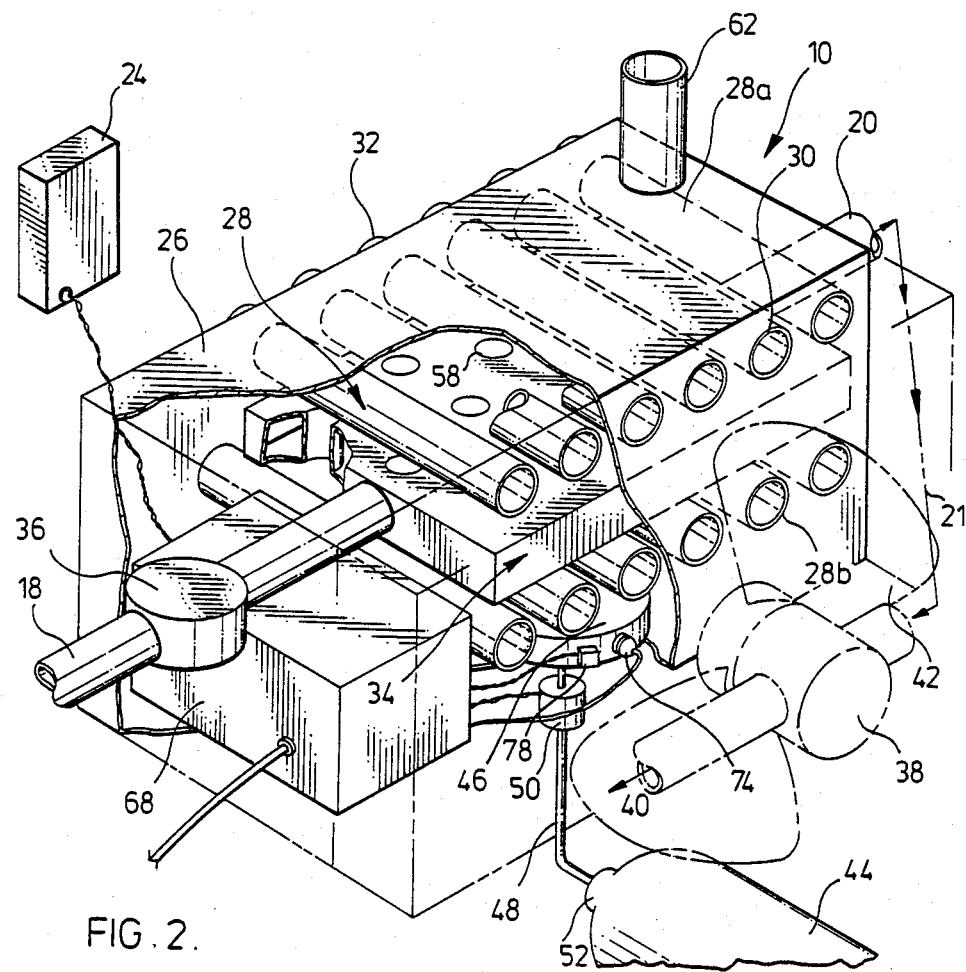
FIG. 2 is a perspective view of the heater having a portion cut away to show interior components thereof.

Turning to FIG. 2, details of the heater 10 are shown. The heater comprises a metal housing 26 which may be formed of sheet metal to withstand the temperatures of operation of the unit. Within the metal housing 26, there are a plurality of tubes 28 which, according to this preferred embodiment, are provided in two rows namely row 28a and row 28b. The rows are parallel to one another where the tubes themselves extend parallel to one another through the metal housing 26. The tubes are preferably formed of metal, such as copper which provide for an efficient transfer of heat from the combustion gases to the air passing through them. The tubes 28 comprise a set of first tube ends 30 and second set of tube ends 32 which are in communication with the exterior of the housing 26. According to this preferred embodiment, tube ends 32 extend slightly beyond the housing 26 to ensure that when mounted on the fire wall 12 of the vehicle they extend into the interior of the vehicle. In addition, such extension also assists in the convection flow of warming air through the tubes in a manner to be discussed with respect to FIG. 4. The first set of tube ends are essentially flush with the housing interior wall 88 as shown in FIG. 4.

Located between the two sets of tubing 28a and 28b is a metal chamber 34 which is used to heat the coolant. Hose 18 leads into the chamber 34 in which a check valve 36 is provided. The coolant is discharged from the chamber 34 into hose 20 which leads eventually back to the engine 16. According to this preferred embodiment, the coolant passes along line 21 to a turbine 38 emerging therefrom in the direction of arrow 40 for return to the engine 16. The purpose of the turbine 38 is to drive the fan 42 which assists in forcing the flow of air into the vehicle interior 22.

A portable fuel supply 44 for the gas burner 46 is provided. A line 48 delivers the gas to the burner 46 where an on/off valve 50 is provided in line 48 to control the flow of fuel to the burner 46. According to this embodiment, it is appreciated that various types of fule may be used such as propane, natural gas, kerosene and gasoline. The fuel supply 44 is preferably that of propane which can be purchased in small propane bottles and readily connected to line 48 by suitable couplings 52 as are well understood by those skilled in the art. The burner 46 may be of the "pilot light" variety which burns a minimum amount of gas and thus adds considerable life to each cylinder 44 used. The pilot light has been found to provide sufficient heat for heating the tubing to heat the interior of the car and in addition to heat the coolant of the car engine. Various forms of propane pilot lights are available which are readily usable with the cylinders 44 to give the necessary heat output.

As shown in FIG. 3, the burner 46 is located beneath the lower bank 28b of the tubes. Flame 54 emerges from the pilot light 46, passing combustion products over the tubes 28b in the directions of arrow 56. The combustion gases 56, after they pass over the tubes 28b, pass upwardly through chamber 34 via channels 58 provided in the chamber 34. Such channels 58 are provided completely through the chamber 34 as located in several areas about the chamber 34 shown in FIG. 2. The combustion products continue upwardly through the upper bank 28a of tubes in the direction of arrow 60 and are then vented exterior of the metal housing 26 by way of vent pipe 62 in the direction of arrows 64. Appropriate piping may be provided to vent the gases exterior of the or downwardly of the vehicle if desired. In this manner, the tube banks 28a and 28b are heated along with the coolant in spaces 66 of the chamber 34. With the channels 58 extending through the chamber, the coolant can pass through the chamber and be heated as it comes in contact with the walls of the channels 58. Check valve 36 ensures that the flow of coolant is outwardly in the direction of arrow 21 to ensure a continuous circulation of the coolant in that direction so as to properly warm the engine block.

An electronic controller 68 is provided to control the various functions of the heater. Controller 68 has input from the temperature sensor via line 70. Controller 68 controls valve 50 via line 72. Control to the ignitor 74 is provided via line 76. The safety device for sensing if the gas burner is operating 78 is connected to the controller via wire 80. When the controller 68 determines that the vehicle interior is below a preset temperature, which may be programmed into the controller 68, it then turns on the gas valve 50 by sending a signal through line 72. Gas valve 50 may have a solenoid control valve arrangement whereby an electrical signal in line 72 opens the valve by actuating a solenoid. Gas then flows to the pilot light burner arrangement 46. An ignitor 74, which may be in the form of a spark plug or the like, is then actuated by an electrical signal in line 76 as controlled by controller 68 to light the fuel. Air intake 82 is provided to allow air to flow into the burner area to provide the proper mixture of fuel to air for proper combustion. The controller 68 may be programmed such that after a predetermined period of time, approximately 10 seconds, if safety sensing device 78 determines that a flame is not present, the controller shuts off the valve 50 by way of a signal in line 72. The controller 68 may additionally be programmed to attempt a restart of the burner in five minutes time. Additional information may be programmed into the controller 68, such as for example, after three attempts to light the burner, then it shuts down and may light a warning light or the like to indicate that the burner is faulty and requires repair. An additional safety back-up may be provided to cover the situation where the safety sensing device 78 is malfunctioning and unlit fuel continues to flow. A gas sensor may be located near the heater to sense any uncombusted gases and sound an alarm if the gaseous vapours exceed a safe level. Such gas sensors are commonly used, particularly in sensing propane leaks.

The flow of coolant through line 20 is directed to turbine 38. With the coolant flowing in the direction of arrow 40, a fan 42 is power driven from an output shaft of the turbine 38. The fan 42 is rotated in a direction so as to cause a flow of air from intake opening 84 through the tubes 28a and 28b to emerge in the directions of arrows 86. Thus the energy imparted to the coolant in heating the engine block is partially tapped to drive the turbine to in turn cause the fan to assist in forcing warmed air into the car interior. In the event that the vehicle interior is of relatively large volume, an additional vehicle interior space heater may be provided at the rear of the vehicle. The chamber 34 may be divided into two parts where the first part handles the coolant from the engine. A heat exchange medium may be provided in the second chamber and by appropriate tubing connected to the additional vehicle interior space heater. As the burner heats the heat exchange medium in the second chamber, it flows to the additional vehicle interior space heater to exchange the medium heat content with the vehicle interior.

It is appreciated that the outlet of the second ends 32 of the tubing may be connected to car heating ducts or the like to direct the warming air into the interior. The tubes 28 may be sloped slightly upwardly as shown in FIG. 4 so that in the event that it is not desired to use a fan arrangement 42, by convection the combustion gases emerging from the burner 46 as they heat the tubes 28 cause the heated air to flow in the direction of arrows 86. This is obviously a desirable arrangement when the unit does not incorporate the chamber 34 for heating the coolant of the engine. Of course depending upon the vehicle fire wall slope, the slope of the tubes 28 in the housing 26 is determined to ensure that when mounted on the fire wall the tubes have the upward slope as indicated.

As shown in FIG. 5 with the heater device 10 mounted on a vehicle wall 12, it may be totally encased in the metal housing 26 with interior wall 88 separating the cowling 90 for the fan from the interior of the remainder of the housing 26. The intake 84 for the fan 42 is provided in the wall of the housing 26. A U-shaped bracket 92 may be used to firmly secure by way of fasteners 94 the heating unit 10 to the fire wall 12.

The heating unit according to this invention therefore provides an inexpensive device which may be readily mounted to the vehicle interior wall to provide multiple purpose forms of heating of not only the vehicle interior, but also the coolant of the engine. A turbine may be used to derive energy from the flow of the coolant to in turn drive a fan which assists the flow of air into the vehicle interior. It is appreciated that the inlet for the fan may be coupled to ducting which extracts air from the vehicle interior to expedite the interior heating by a closed circuit flow of air about the interior.

Although various preferred embodiments of the invention have been described in detail, it will be understood by those skilled in the art that variations may be made thereto without departing from the spririt of the invention or the scope of the appended claims.

The embodiments of the invention in which an exclusive property or privilege is claimed are defined as follows:

1. An auxiliary vehicle interior space heater comprising a hollow metal housing with a plurality of metal tubes extending generally parallel to each other and through the housing, said tubes having a first set of tube ends and a second set of tube ends in communication with the space exterior of said housing, a gas burner which uses a portable form of fuel located in said housing for heating said tubes, means for mounting said housing on an exterior vehicle wall which has a surface interior of a vehicle with an opening to place said second set of tube ends in communication with vehicle interior, said second set of tube ends extending beyond said housing to provide tube extensions of said second tube ends within a vehicle interior, said first set of tube ends being essentially flush with said housing, said mounting means when used on a vehicle exterior wall positioning said tubes to slant them slightly upwardly toward vehicle interior, said gas burner heating said tubes to heat air within and by convection cause the heated air to enter vehicle interior and means for venting combustion products from said gas burner to exterior of said housing.

2. An auxiliary vehicle interior space heater comprising a hollow metal housing with a plurality of metal tubes extending generally parallel to each other and through the housing, said tubes having a first set of tube ends and a second set of tube ends in communication with the space exterior of said housing, a gas burner which uses a portable form of fuel located in said housing for heating said tubes, means for mounting said housing on an exterior vehicle wall which has a surface interior of a vehicle with an opening to place said second set of tube ends in communication with vehicle interior, said mounting means when used on a vehicle exterior wall positioning said tubes to slant them slightly upwardly toward vehicle interior, said gas burner heating said tubes to heat air within and by convection cause the heated air to enter vehicle interior and means for venting combustion products from said gas burner to exterior of said housing, a metal chamber being provided in said housing, said chamber extending generally in the direction of said tubes with said tubes proximate said chamber, said chamber having an inlet and an outlet extending exterior of said housing for connection to car engine coolant system, said burner heating said chamber to warm coolant in said chamber and cause a flow of coolant through said chamber via said inlet and outlet, said plurality of tubes being arranged in two spaced-apart rows, said chamber being positioned between said rows of tubes, said burner being located beneath lower of said two rows of tubes said chamber having a plurality of channels extending therethrough in a direction generally perpendicular to the direction of said tubes, hot combustion gases from said burner as they flow over the lowermost row of tubes, flow upwardly through the channels in said chamber and over the uppermost row of tubes.

3. A space heater of claim 1, wherein a metal chamber is provided in said housing, said chamber extending generally in the direction of said tubes with said tubes proximate said chamber, said chamber having an inlet and an outlet extending exterior of said housing for connection to car engine coolant system, said burner heating said chamber to warm coolant in said chamber and cause a flow of coolant through said chamber via said inlet and outlet.

4. A space heater of claim 3, wherein a fan is associated with said first or second set of tubes ends for assisting the flow of air through said tubes and into vehicle interior, means is provided for extracting energy from the flow of coolant to dirve said fan.

5. A space heater of claim 4, wherein said fan drive means comprises a turbine driven by a flow of coolant through said chamber, said turbine having an output shaft, said fan being mounted on said shaft for rotation in a direction to pass air into vehicle interior.

6. A space heater of claim 3, wherein a second metal chamber is provided in said housing adjacent said first chamber, said second chamber having an inlet and an outlet extending exterior of said housing for connection to an additional vehicle interior space heater, said burner heating a heat exchange medium in said second chamber which flows to an additional vehicle interior space heater to exchange said medium heat content with vehicle interior.

7. A space heater of claim 1, wherein means senses the vehicle interior temperature, valve means controls the supply of fuel to said burner and means ignites the fuel supplied to said burner, an electrical controller for opening said valve means on sensing through said temperature sensing means that vehicle interior temperature has dropped below a predetermined value, said controller actuating said ignitor means to ignite the fuel supplied to said burner.

8. A space heater of claim 7, wherein safety means senses if such fuel has been ignited after said valve means is opened, upon sensing through said safety means that such fuel has not ignited said controller shuts off said valve means.

9. A space heater of claim 8 wherein said controller is adapted to attempt ignition of fuel to said burner after a predetermined waiting period by opening said valve means and actuating said ignitor means.

* * * * *